United States Patent Office 3,535,806
Patented Oct. 27, 1970

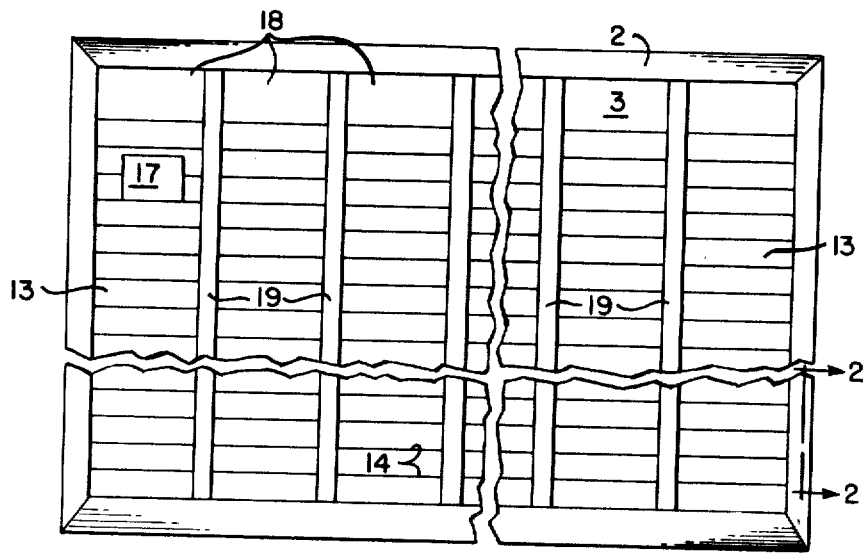
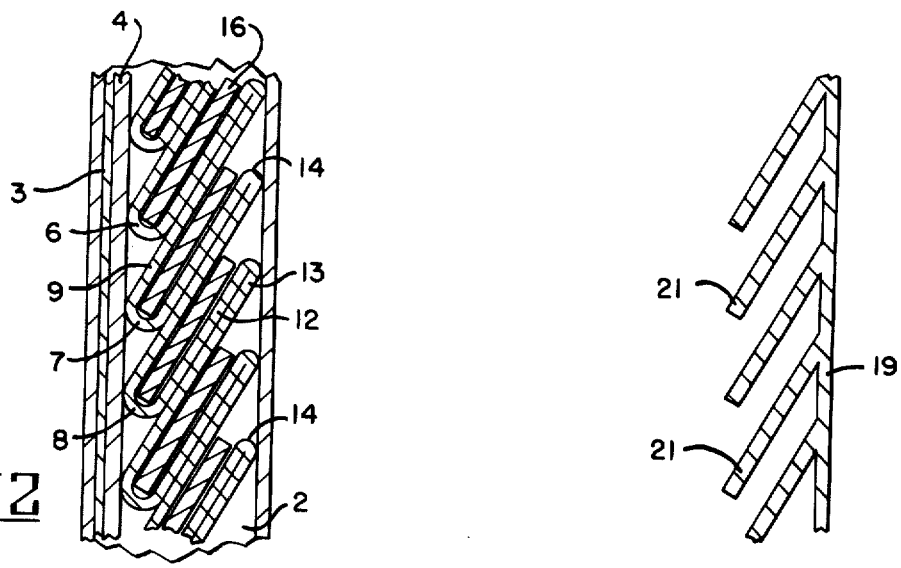
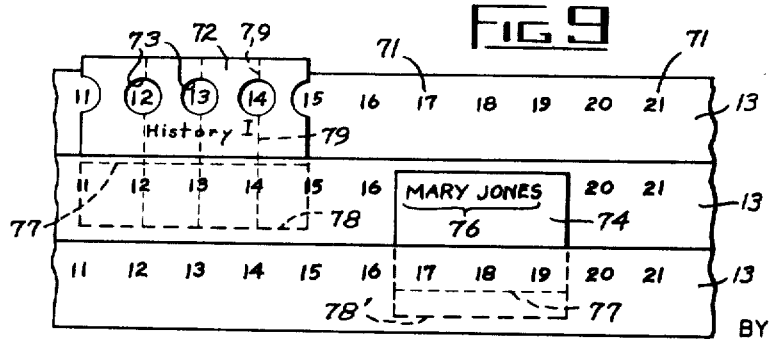

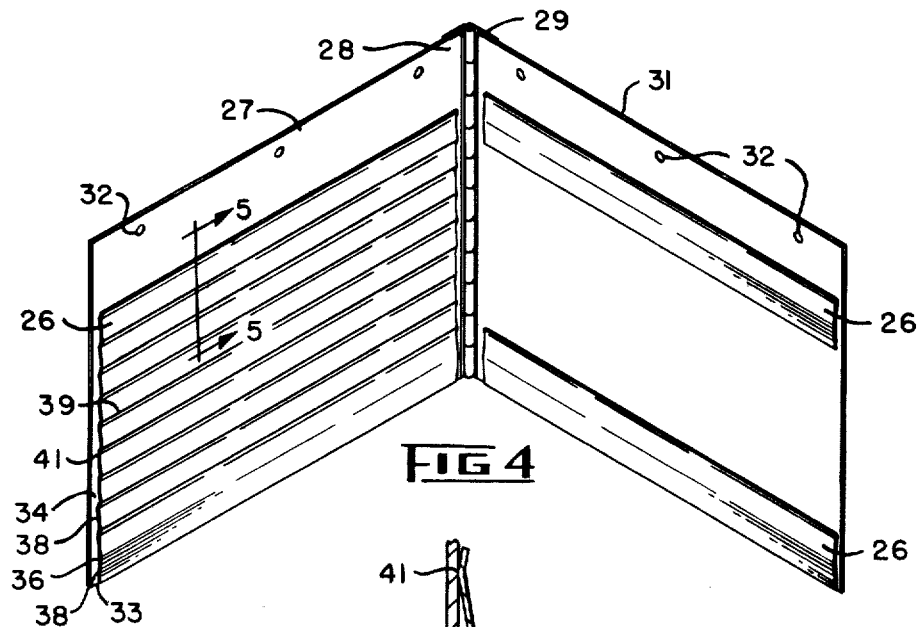
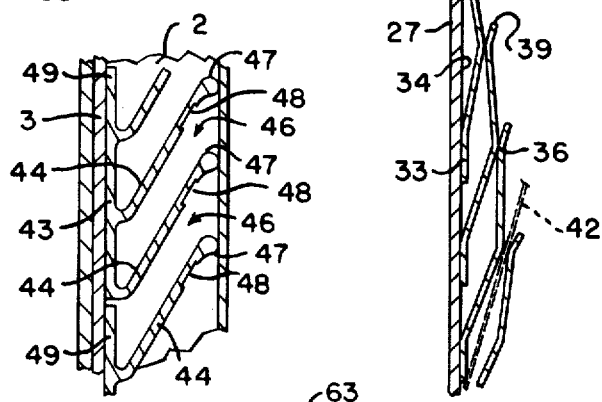
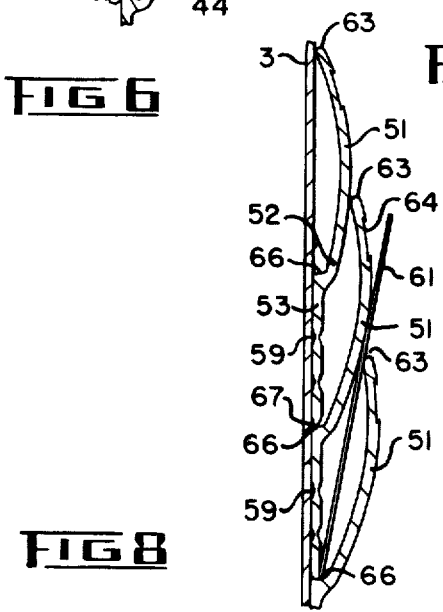
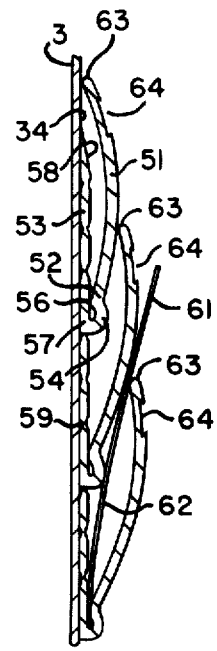

3,535,806
FILING DEVICE FOR RECEIVING AND DISPLAYING CARDS CONTAINING DATA
Hartwell F. Tucker, P.O. Box 1133,
Mountain View, Calif. 94040
Filed Jan. 24, 1968, Ser. No. 700,122
Int. Cl. G09f 1/10
U.S. Cl. 40—124.2
14 Claims

ABSTRACT OF THE DISCLOSURE

A filing panel is provided having filing pockets into which may be inserted cards on which are displayed data of any desired variety. The panel comprises a supporting member and the pocket structures comprise strips of resilient material attached to the supporting structure, with the data-displaying cards being inserted behind the resilient strips in a manner that the data displayed is visible above the pockets.

BACKGROUND OF INVENTION

There are many activities that require that one person monitor the numbers of people engaged in an activity, and keep track of additions and deletions made in the group of persons, and in the activity itself. For instance, a teacher in a classroom must be familiar with the different activities of all the different students, and be able to determine whether or not students are properly attending their appointed classes. Or, an administrator in a school must know how many classrooms he has available, which classrooms have been assigned to what teachers, and what particular subjects are being taught in specific classrooms so that students and teachers and time allocation may be made in accordance therewith. Accordingly, it is one of the important objects of this invention to provide a filing device which permits the use of data cards corresponding to the various functions or activities to be performed, which cards may be filed in the filing device in such manner that a mere glance will indicate necessary information.

Teachers and school administrators must frequently carry home with them data pertaining to classes to which they are assigned, the different students in each class, and the rooms to which each class is assigned. This information can of course be compiled on a separate sheets of paper, but such compilation is time-consuming, difficult to read, and is generally useless for any other purpose. Accordingly, it is another object of the invention to provide a filing and scheduling device suitable for use by teachers and school administrators for keeping track of students, classes, rooms, and teachers assigned to any one of these units, and to present this information in such form that teachers and school administrators may easily fit the filing device into a brief case or binder for use away from the classroom.

Many businesses require the use of IBM punch cards, job tickets, time cards, operation forms, scheduling forms and filing cards of various types in the conduct of the business. Normally, these cards are filed in conventional filing cases or filing systems. It is one of the objects of this invention to provide a filing and scheduling device in which such cards may be filed, with a portion of the card displayed for ready reference by responsible personnel who must refer to such cards during the course of the business day.

Frequently, filing systems start out small and as the business grows and the usage of the filing system or device increases, the device becomes obsolete because it is no longer large enough to accommodate all of the cards that require filing. Accordingly, it is a still further object of the invention to provide a filing device for cards containing data to be displayed that may be expanded as desired to accommodate additional cards.

Heretofore filing systems and filing devices have lacked versatility in that filing device suitable for use to file cards pertaining to one function, such as time cards, has not been suitable for use in filing cards pertaining to another function, such as job tickets or scheduling forms. Accordingly, it is a still further object of the invention to provide a filing device in which individual pockets may be labeled in order to render the device versatile in handling the cards pertaining to any selected function.

In the many different activities that utilize filing cards of various designs, the cards utilized are not always the same size. Accordingly, another object of the invention is to provide a filing device having pockets that may be selectively broadened or narrowed to accommodate cards of different sizes.

One of the objections to conventional card filing devices is the tendency for cards filed in the systems to be lost. Therefore, it is a still further object of the invention to provide a filing device for cards containing data in which the cards are resiliently retained within the pocket in which they are inserted.

The invention possesses other objects and features of advantage, some of which, with the foregoing, will become apparent from the following description and the drawings. It is to be understood however that the invention is not limited to the embodiment illustrated and described, as it may be incorporated in different forms within the scope of the appended claims.

SUMMARY OF INVENTION

Broadly considered, the filing device of the invention comprises a base member which may be formed by a piece of fiberboard, cardboard or plastic material of appropriate weight, one surface of which may be designated a support surface. Mounted on the support surface is, in one aspect of the invention, a single sheet of flexible material folded to provide a plurality of pockets running across one dimension of the support surface. Spacers are provided associated with each of the pockets to retain the sides thereof spaced to permit the insertion of data cards. In another aspect of the invention, the base member is utilized to support a multiplicity of individual strips of resilient material, each of which is formed to cooperate with either the support surface or with a next adjacent card to form a pocket therebetween into which a data card may be inserted. Means may be provided associated with each of the strips for gauging the distance between associated strips and thereby controlling the number of pockets or series of pockets that may be supported over a given width of support surface. Means are also provided on the pocket structure for fastening identifying indicia to indicate the purpose of the particular pocket carrying the indicia.

BRIEF DESCRIPTION OF DRAWINGS

FIG. 1 is a front elevation of a complete filing device indicating a rigid structure having a multiplicity of vertically spaced pockets each of which is divided into shorter segments by vertically extending spacing devices.

FIG. 2 is a fragmentary vertical sectional view in enlarged scale taken in the plane indicated by the line 2—2 of FIG. 1.

FIG. 3 is a fragmentary view in enlarged scale of a portion of one of the spacing devices illustrated in FIG. 1.

FIG. 4 is a perspective view showing a pair of support surfaces or base members hinged together at adjacent edges so that the filing device may be closed like a book.

FIG. 5 is a fragmentary cross-sectional view taken in the plane indicated by the line 5—5 in FIG. 4.

FIG. 6 is a fragmentary view in vertical section of a pocket structure forming a different embodiment of the invention.

FIG. 7 is a fragmentary view in vertical section similar to FIG. 6 and showing a still different embodiment of the invention.

FIG. 8 is a view similar to FIGS. 6 and 7 and illustrating another embodiment of the invention.

FIG. 9 is an enlarged fragmentary view illustrating the filing device used in two different ways.

DESCRIPTION OF PREFERRED EMBODIMENT

In terms of greater detail, and referring specifically to FIG. 1, the filing device of the invention includes a rigid frame 2 formed by upper, lower and side members as indicated, and serving to support a back cover plate 3, attached around its peripheral edge portion within the channel. Attached to the back cover is a core member 4, illustrated best in FIG. 2, comprising a relatively flat sheet of material, either plastic or fiberboard. In the embodiment of the invention illustrated in FIGS. 1 through 3, the pocket structure comprises a single sheet of material folded as indicated best in FIG. 2 to provide a plurality of vertically spaced bights 6, 7 and 8.

Each of the bights forms the bottom of a pocket inclined with respect to the vertical as shown, and having lateral side walls formed by transversely extending sheet portions 9 and 12. The upper portion of each transverse sheet portion 9, designated in FIGS. 1 and 2 by the numeral 13, forms the portion of each pocket exposed to view as indicated best in FIG. 1. The upper end of the transverse sheet portion 13 joins the associated side 12 of each pocket in a tight bend or fold 14 as indicated within the channel 2.

Projecting into each of the pockets defined by sides 9 and 12, is a spacer 16 which supports the pocket sides in substantially parallel relationship as shown. The length of each spacer element is short enough to be contained within the peripheral channel member 2. As indicated in the upper left-hand corner of FIG. 1, each of the pockets is proportioned so that a card 17 may be inserted thereinto and contained within the pocket.

The pockets in accordance with the structure disclosed above extend the full length of the panel formed by the frame 2. It is convenient to divide these longitudinally extending pockets into shorter segments 18. For this purpose each of the segments 18 is defined by vertically extending spacers, each having a strip portion 19 visible in FIG. 1 in elevation, and visible in FIG. 3 in side elevation. The strip 19 on one side thereof is provided with a multiplicity of evenly spaced flanges 21, each of which is integral at one end with the strip 19 and is inclined thereto in the same amount that the pockets are inclined with respect to the vertical. Accordingly, when a spacer strip is applied, as viewed in FIG. 1, each of the flanges 21 extends into a pocket and serves to support the sides of each of the pockets in parallel relationship intermediate their ends. Preferably, each of the flanges 21 is spaced along the strip 19 in correlation to the spacing between pockets as viewed in FIG. 2.

It will thus be seen that the filing device disclosed in FIGS. 1 through 3 will accommodate many different types and sizes of cards, each of which may be printed to display whatever type of data is required.

Instead of forming the pocket structure from one single sheet which has been folded to provide a multiplicity of pockets in the manner disclosed in FIG. 2, each of the pocket structures may be formed from a single sheet in the form of a strip 26, supported on a base member 27, one edge 28 of the base member being provided with a hinge 29 for attachment to a similar support structure or base member 31, as shown best in FIG. 4. The pair of base members may thus be opened and closed in the manner of a book, in order to cover and protect pocket structures contained therewithin. Where desired, each of the base members may be provided with a multiplicity of apertures 32 spaced to permit mounting of the filing device in a standard ring binder.

In the embodiment illustrated in FIGS. 4 and 5, each of the individual strips 26 is preferably elongated as indicated, and is attached adjacent its lower edge 33 to the supporting surface 34 of the base member. Each strip intermediate its transverse edges is provided with a crease or crown 36, which divides the transverse dimension of the strip into joined yet angularly disposed portions 37 and 38. The free edge of the strip 39 adjacent section 38 is rolled back to provide a small space between the edge of the strip and the support surface 34 to accommodate insertion of a card therebehind. The portion of the strip immediately adjacent the rolled-back edge 39, indicated at 41, resiliently impinges against the supporting surface 34 in the absence of a card behind the strip, and when a card is inserted, the inherent resilience of the strip retains the card resiliently in the bight formed between the support surface 34 and the inner concave surface of strip 26. As shown best in FIG. 5, each of the strips 26 is attached to the support surface 34 in a manner that the rolled-over edge of each strip lies superimposed above the next adjacent strip. Accordingly, the insertion of a card 42, as indicated in FIG. 5, results in the lowermost strip being flexed outwardly as indicated in dash lines. The card is therefore resiliently retained in the pocket in order to preclude inadvertent loss.

The pocket structure illustrated in FIG. 6 is modified from the individual strips disclosed in FIG. 4. In this embodiment, the channel 2 again supports the pocket structure, having a backing member 3 as indicated in FIG. 1. Supported on the backing member are a plurality of individual pocket assemblies indicated generally by the numeral 42, each pocket assembly including a base strip 43 to which is integrally attached or formed a plurality of angularly disposed flanges 44 vertically spaced as shown in order to provide separate vertically spaced pockets 46. Each of the flanges 44 adjacent its outer end 47 may be provided with a channel or groove 48, as indicated, within which may be contained identifying indicia of various types. As with the embodiment illustrated in FIG. 1, this embodiment may utilize a vertically disposed and horizontally spaced series of spacers such as that disclosed in FIG. 3. Additionally, as viewed best in FIG. 6, each of the base strips 43 is provided adjacent one end with a projecting portion 49 as shown, the upper end of which abuts the lower edge of the strip next above. The projecting portion is proportioned to space one strip from the other so that the uppermost flange 48 of one strip lies spaced from the lowermost flange of the assembly next above a distance equal to the spacing between adjacent flanges formed on a single strip. This results in all of the pockets being equally spaced vertically across the support surface.

Referring now to FIGS. 7 and 8, as there shown, the base member 3 is utilized to support a still different pocket construction. In this embodiment, each of the pockets is formed from an individual strip having a concave pocket portion 51 joined at one edge 52 by a mounting portion 53. In the embodiment illustrated in FIG. 7, the mounting portion 53 is joined to the lower edge 52 of the concave pocket portion by a section 54 which extends slightly away from the support surface 34 to provide a ridge 56 proportioned so that in the absence of a data card, the ridge 56 abuts the surface of the mounting portion 53.

In this embodiment, the mounting portion 53, extending from the outwardly projecting portion 54, is bent around as indicated at 57 and extends upwardly substantially parallel to the concave pocket portion 51 and lies beneath the strip within the concavity formed thereby. The upper edge portion 58 of the mounting section 53 is preferably chamfered or beveled as at 58 to permit insertion of a data card in the pocket formed between the concave portion 51 and the mounting portion 53.

Where a multiplicity of such-pocket-forming strips are utilized, in a side-by-side relationship, as indicated in FIG. 7, the mounting portion 53 is preferably provided with elongated scores or grooves 59 which diminish the cross-sectional dimension of the mounting section and thus permit strips of the mounting section 53 to be broken off to decrease its width. It is important to have this versatility because, as indicated in FIG. 7, the width of the mounting portion 53 determines the extend of overlap between one concave pocket-forming portion 51 and the next, the greater the width of the mounting portion, the less overlap there is between adjacent portions.

FIG. 7 clearly illustrates, that upon the insertion of a card 61 as shown, the card lies trapped in the bight formed between the reentrant section 47 and the outwardly extending section 54, with the ridge 56 bearing resiliently against the card. This resilient pressure tends to bow the card inwardly at 62 as shown, and results in the upper end or free edge 63 of the concave pocket forming portion 51 imposing a resilient force on the card intermediate its ends. The card thus lies trapped between two adjacent pocket portions and is supported at two separate points. The height of each card is proportioned so that identifying indicia supported in the longitudinal grooves 64 formed adjacent the top edge 63 of each of the concave pocket portions remains visible even though the filing device is completely full of filed cards 61.

In the embodiment illustrated in FIG. 8, the construction is essentially the same as that illustrated in FIG. 7, with the difference that in this embodiment the mounting portion 53 extends downwardly as shown so as to eliminate the pressure ridge 56 provided in the embodiment illustrated in FIG. 7. As before, the mounting portion 53 is provided with longitudinally extending scores 59 which permit breaking off of strips of the mounting portion to vary its width. Again, the width of the mounting portion determines the amount of overlap because each of the mounting portions is adapted to abut the next adjacent strip. For this purpose, each of the strips, in the zone between pocket portion 51 and mounting portion 53, is provided with shoulder 66 against which the extreme end 67 of the mounting portion 53 may abut. As indicated in FIG. 8, the insertion of a card 61 into the pocket formed by each of the concave portions 51 results in the bottom of the card 61 being caught in the bight between the mounting portion 53 and the inner concave surface of strip 51 adjacent shoulder 66. As before, the card 61 may be proportioned to render the data-bearing groove 64 completely invisible after the card has been inserted, or it may be cut off at a shorter length to permit visibility of such data even when the filing device is full of filed cards.

FIG. 9 illustrates two different ways in which the filing device of the invention may be used. As there shown, the vertically spaced strips 13 forming three different pockets are mounted on a support structure as previously described, and each of the strips is provided with a series of indicia 71 in the form of numbers, here shown to extend from the number 11 through the number 21. These numbers may be taken to represent, for instance, separate units of time into which a given day, for instance a school day, is divided for the purpose of assignation of classes. It is noted that in modern education these units of time, generally extend for twenty minutes, and are popularly known as "modules" of time. Thus, the filing device of the invention may be conveniently used to designate one or more of these "modules" as being assigned to a specific class. For instance, in FIG. 9, the card 72 inserted in one pocket of the filing device may conveniently represent a class in "History I," and the position of this card will indicate that time modules 12, 13 and 14 have been assigned to this class. As indicated in FIG. 9, the designated time modules are visible through apertures 73 appropriately formed in the card. It will be apparent that by utilizing cards of different width and cards of different color, many different conditions required to be controlled in terms of the assignation of teachers to classes and students to classes and classes to time modules throughout the school day may be indicated at a glance. Referring again specifically to FIG. 9, the card 74 having the indicia 76 representing the name of a pupil may be inserted in one of the filing pockets in any position to correspond with information that must be correlated with respect to that student. For instance, the card bearing the indicia "Mary Jones" may indicate whether the named student is from an average home, or one in which there is a father only or a mother only, or the card may indicate whether the named student is a slow learner, an average learner or a fast learner. The type of information that may be borne by the card is limited only by the imagination of the person responsible for filling the card.

Versatility in the use of the filing device of the invention may be increased by designing the card 72 or 74 to provide a series of perforations 77 spaced from the bottom edges 78 and 78' of cards 72 and 74, respectively. The performations 77 provides versatility in that the bottom portion of each card may be broken off at the line of perforations with the result that the card may be inserted into the supporting pocket so that the top edge will lie lower with relation to the pocket next above. This break line of perforations may be gauged at any height to achieve a desired result. For instance, the height may be such as to cover a specific number of indicia, or it may be spaced so that the top edge of the card 72, for instance, lies below a given number of indicia. On the other hand, it may be desirable that a given card span only one or two, or perhaps six, modules of time represented by the indicia 71. This purpose is accomplished by providing each card 72, for instance, with a spaced series of vertically extending performations 79 permitting sections of the card to be broken off to vary its width. In general, it is not practical that the cards be less than one module wide nor more than six modules wide.

From the foregoing description it will be apparent that in utilizing any one of the embodiments illustrated and described, the filing device is versatile in that it may accommodate cards of different length and width, and the expanse of the device may be increased or decreased at will. For instance, each of the individual pocket-forming strips illustrated in FIGS. 5, 6, 7 and 8 may be adhesively attached to the supporting surface by means of a pressure sensitive adhesive. When it is desired to add additional pockets to the filing device, additional strips need only be attached, or if the filing device requires that it be consolidated somewhat, some of the strips may be removed to decrease the number of pockets.

I claim:

1. A filing device for receiving and displaying cards containing data to be displayed comprising:
   (a) a base member having an exposed support surface thereon;
   (b) a pocket structure supported on the base member and including at least one sheet of material attached adjacent one edge thereof to the base member to provide an opening to receive a card bearing data to be displayed; and
   (c) said sheet being in the form of an elongated strip including a pocket portion and a mounting portion, said pocket portion having a free edge abutting the pocket portion of the underlying strip or said support surface and having a concave surface facing the base member and said mounting portion being attached along one edge to the pocket portion and having an adjacent portion attached to the support surface of the base member.

2. The filing device according to claim 1, in which said mounting portion is proportioned in width so that when a plurality of strips are supported in side-by-side relation the mounting portion of one strip abuts the adjacent strip so that the free edge of the concave pocket portion of one strip lies superimposed over the pocket portion of the adjacent strip.

3. The filing device according to claim 2, in which said mounting portion is scored longitudinally to define a break line of relatively thinner cross-section than the remainder of the mounting portion so that a portion of the mounting portion may be broken off to vary the width of the mounting portion so as to vary the amount of overlap of one strip by an adjacent strip.

4. The filing device according to claim 1, in which said mounting portion is doubled back so that it lies beneath the concave pocket portion.

5. The combination according to claim 12, in which said pocket portion is provided with a ridge spaced from the union of said pocket portion and said mounting portion whereby a card inserted into said pocket past said ridge is resiliently retained thereby and by the upper edge of the mounting portion whereas a card inserted for less than the full depth of the pocket is resiliently retained only by the upper edge of the mounting portion and projects above a card inserted past the ridge.

6. A filing device for receiving and displaying cards containing data to be displayed comprising:
 (a) a base member having an exposed support surface thereon;
 (b) a pocket structure supported on the base member and including at least one sheet of material attached adjacent one edge thereof to the base member to provide an opening to receive a card bearing data to be displayed; and
 (c) said sheet being in the form of an elongated flat strip having a plurality of vertically spaced parallel flanges formed integrally on one side of said strip and lying angularly disposed with respect to the flat strip so as to form pockets therebetween.

7. The filing device according to claim 6, in which a plurality of said strips are provided in side-by-side relation so that the last flange on one strip is spaced from the first flange on the next strip an amount equal to the spacing between adjacent flanges on a single strip.

8. A filing device for receiving cards to be filed comprising:
 (a) a base member having an exposed support surface thereon;
 (b) a pocket structure supported on the base member and including at least two elongated strips each attached adjacent one edge thereof to the support surface of the base member to provide an elongated opening between the opposite edge thereof and the next adjacent strip to receive a card therebetween;
 (c) indicia means on each strip arranged in an elongated series adjacent said opposite edge thereof; and
 (d) a card having a series of apertures therein adjacent one edge spaced so that when the card is inserted in said elongated opening and supported by the next adjacent strip a selected group of said indicia means on one strip is visible through said apertures.

9. The combination according to claim 8, in which each pocket possesses a predetermined depth, and said card is provided with a series of perforations parallel to one long horizontal edge thereof so that a lower segment of the card may be torn off to modify its height when inserted in a pocket of predetermined depth.

10. The combination according to claim 8, in which said indicia means possesses a predetermined horizontal spacing, and said card is provided with a plurality of horizontally spaced vertically extending lines of perforations so that side segments of the card may be torn off to selectively modify the width of the card and its relationship with said indicia means.

11. A filing device for receiving and displaying cards containing data to be displayed comprising:

(a) a base member having an exposed support surface thereon;
 (b) a pocket structure supported on the base member and including at least one sheet of material attached adjacent one edge thereof to the base member to provide an opening to receive a card bearing data to be displayed; and
 (c) said sheet being in the form of an elongated strip having a crease intermediate its long edges so that portions of the strip on opposite sides of the crease lie in different planes, one long edge of the strip being rolled back in a direction away from the base member to facilitate insertion of a card, a surface portion of the strip between said rolled edge and said crease resiliently impinging against the support surface of the base member or against another elongated strip interposed between said surface portion of the strip and the base member.

12. A filing device for receiving and displaying cards containing data to be displayed comprising:
 (a) a base member having an exposed support surface thereon;
 (b) a pocket structure supported on the base member and including at least one sheet of material attached adjacent one edge thereof to the base member to provide an opening to receive a card bearing data to be displayed; and
 (c) said sheet being in the form of an elongated strip having a crown on one side and a concavity on the other side, one edge of the strip being attached to the base member so that the concavity faces the base member and said base member and strip form a bight, the edge of the strip opposite the edge attached to the base member rolled back to form a lip, a surface portion of the strip adjacent the lip bearing resiliently against the base member or against another elongated strip interposed between said surface portion of the strip and the base member so as to resiliently retain a card confined in the pocket so formed.

13. A filing device for receiving and displaying cards containing data to be displayed comprising:
 (a) a base member having an exposed support surface thereon;
 (b) a pocket structure comprising a single sheet of material folded to provide a bight constituting the bottom of the pocket with lateral portions of the sheet on opposite sides of the bight being spaced to form the sides of the pocket, the edge of the sheet formed by the bight being secured to said base member;
 (c) means between said lateral portions of the sheet at spaced intervals along the sheet to maintain the spacing between the side of the pocket; and
 (d) a peripheral channel member constituting a frame within which said base member lies secured, opposite ends of the sheet being caught in the channel frame, and spacer elements attached to the frame within the channel to retain a selected spacing between the sides of the pocket.

14. A filing device for receiving and displaying cards containing data to be displayed comprising:
 (a) a base member having an exposed support surface thereon;
 (b) a pocket structure supported on the base member and comprising a single sheet of material folded to provide a plurality of parallel bights spaced transversely across the sheet to form the bottoms of separate pockets, portions of the sheet on opposite sides of each bight being spaced to form the sides of the associated pocket;
 (c) means between said lateral portions of the sheet at spaced intervals along the sheet to maintain the spacing between the sides of the pockets; and (d) said spacing means including an elongated strip having a series of inclined flanges projecting from one side thereof, the length of the flanges corresponding to the depth of the pockets, and the spacing between the flanges corresponding to the spacing between adjacent pockets, the thickness of the flanges determining the spacing between lateral sides of the pockets.

References Cited

UNITED STATES PATENTS

| | | | |
|---|---|---|---|
| 120,134 | 10/1871 | Wall | 40—124.2 |
| 1,917,123 | 4/1933 | Hutchings | 40—124.2 |
| 2,963,808 | 12/1960 | Guichard | 40—124.2 |
| 3,012,348 | 12/1961 | Smith | 40—124 |
| 3,121,966 | 2/1964 | Upton | 40—124.2 |

FOREIGN PATENTS

| | | |
|---|---|---|
| 732,103 | 5/1943 | Germany. |

EUGENE R. CAPOZIO, Primary Examiner

W. J. CONTRERAS, Assistant Examiner